United States Patent
Ost et al.

(10) Patent No.: US 10,308,487 B2
(45) Date of Patent: Jun. 4, 2019

(54) MEASUREMENT SYSTEM FOR DETERMINING SUPPORT FORCE

(71) Applicant: TECSIS GMBH, Offenbach (DE)

(72) Inventors: Reinhold Ost, Offenbach (DE); Klaus Haerle, Wangen (DE); Stefan Amendt, Roellbach (DE)

(73) Assignee: TECSIS GMBH, Offenbach (DE)

( * ) Notice: Subject to any disclaimer, the term of this patent is extended or adjusted under 35 U.S.C. 154(b) by 207 days.

(21) Appl. No.: 15/112,345

(22) PCT Filed: Jan. 7, 2015

(86) PCT No.: PCT/CN2015/070287
§ 371 (c)(1),
(2) Date: Jul. 18, 2016

(87) PCT Pub. No.: WO2015/106648
PCT Pub. Date: Jul. 23, 2015

(65) Prior Publication Data
US 2016/0340156 A1    Nov. 24, 2016

(30) Foreign Application Priority Data

Jan. 17, 2014 (CN) .................... 2014 2 0028952 U
Jan. 17, 2014 (CN) .................... 2014 2 0028954 U
(Continued)

(51) Int. Cl.
*B66C 23/90* (2006.01)
*B66C 23/78* (2006.01)
(Continued)

(52) U.S. Cl.
CPC ............ *B66C 23/905* (2013.01); *B66C 23/78* (2013.01); *B66C 23/80* (2013.01); *G01L 1/225* (2013.01); *G01L 5/0061* (2013.01)

(58) Field of Classification Search
CPC ........................................................ B66C 23/905
(Continued)

(56) References Cited

U.S. PATENT DOCUMENTS 3,357,393 A * 12/1967 Urbassik ................ B63H 20/10
242/125.1
4,165,053 A * 8/1979 Konig .................... B65H 75/38
242/378.3
(Continued)

FOREIGN PATENT DOCUMENTS

CN    101499589 A    8/2009
CN    101858800 A    10/2010
(Continued)

*Primary Examiner* — Walter L Lindsay, Jr.
*Assistant Examiner* — Philipmarcus T Fadul
(74) *Attorney, Agent, or Firm* — Muncy, Geissler, Olds & Lowe, P.C.

(57) ABSTRACT

A support force measurement apparatus for determining a support force on a support element of a support structure of a movable working machine. The measurement apparatus has at least one measurement element and a support leg. The measurement element is connected to a deformation body capable of being deformed with an effect of the support force, so as to form a sensor and send a signal proportional to the support force. The support leg has the sensor and is movably connected to the support element. The support element comprises a cable connection, and the cable connection is constructed in a manner of guiding electrical energy and is used for sending the signal proportional to the support force to an analysis apparatus in a machine. The support element in the support leg and the sensor are provided with electromagnetic interfaces.

29 Claims, 11 Drawing Sheets

(30) Foreign Application Priority Data

| Jan. 17, 2014 | (CN) | 2014 2 0029052 U |
|---|---|---|
| Jan. 17, 2014 | (DE) | 20 2014 000 334 U |
| Jan. 17, 2014 | (DE) | 20 2014 000 335 U |
| Jan. 17, 2014 | (DE) | 20 2014 000 337 U |

(51) Int. Cl.
*G01L 1/22* (2006.01)
*G01L 5/00* (2006.01)
*B66C 23/80* (2006.01)

(58) Field of Classification Search
USPC .................................................. 73/862.627
See application file for complete search history.

(56) References Cited

U.S. PATENT DOCUMENTS

| 6,931,912 B2* | 8/2005 | Tsuchie ................... B60T 8/172 |
| | | 73/146 |
| 8,516,945 B2 | 8/2013 | Morath |
| 8,661,916 B2 | 3/2014 | Hose von Wolfframsdorff et al. |
| 2006/0078369 A1* | 4/2006 | Spratte ................... B60G 7/005 |
| | | 403/122 |
| 2007/0092283 A1* | 4/2007 | Sugihara ............ G03G 15/5016 |
| | | 399/81 |
| 2011/0062695 A1* | 3/2011 | Bergemann .............. B66C 23/80 |
| | | 280/763.1 |
| 2011/0065319 A1* | 3/2011 | Oster ................. H01R 13/2414 |
| | | 439/586 |
| 2013/0306348 A1* | 11/2013 | Holzmueller ............ H01B 9/02 |
| | | 174/105 R |
| 2014/0339187 A1 | 11/2014 | Wimmer |
| 2014/0343889 A1* | 11/2014 | Ben Shalom .......... G16H 50/30 |
| | | 702/139 |
| 2015/0006054 A1 | 1/2015 | Hofmann et al. |
| 2016/0290046 A1* | 10/2016 | Orban ....................... E21B 3/02 |

FOREIGN PATENT DOCUMENTS

| CN | 102036903 A | 4/2011 |
| CN | 203772457 U | 8/2014 |
| CN | 203772458 U | 8/2014 |
| CN | 203824679 U | 9/2014 |
| DE | 10 2008 058 758 A1 | 5/2010 |
| DE | 20 2014 000 334 U1 | 4/2014 |
| DE | 20 2014 000 335 U1 | 4/2014 |
| DE | 20 2014 000 337 U1 | 4/2014 |
| EP | 2 159 428 A2 | 3/2010 |
| WO | WO 2013/092068 A1 | 6/2013 |
| WO | WO 2013/120118 A1 | 8/2013 |

* cited by examiner

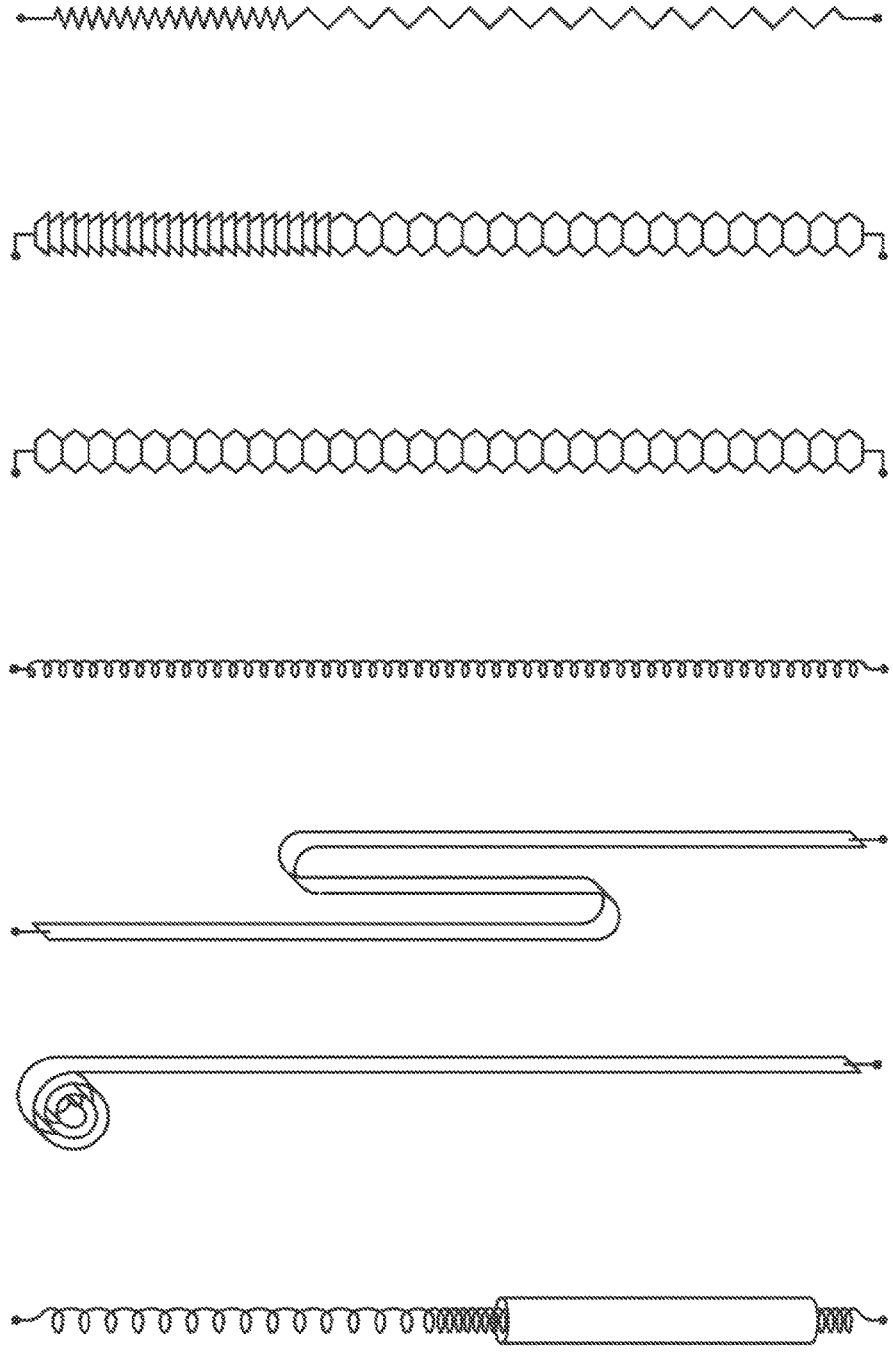

MEASUREMENT SYSTEM FOR DETERMINING SUPPORT FORCE

This nonprovisional application is a national stage of International Application No. PCT/CN2015/070287, which was filed on Jan. 7, 2015, and which claims priority under 35 U.S.C. § 119(a) to Chinese Patent Application No. 201420028952.X, which was filed in China on Jan. 17, 2014, Chinese Patent Application No. 201420028954.9, which was filed in China on Jan. 17, 2014, German Patent Application No. 20 2014 000 334.3, which was filed in Germany on Jan. 17, 2014, German Patent Application No. 20 2014 000 337.8, which was filed in Germany on Jan. 17, 2014, German Patent Application No. 20 2014 000 335.1, which was filed in Germany on Jan. 17, 2014, and Chinese Patent Application No. 201420029052.7, which was filed in China on Jan. 17, 2014, and which are all herein incorporated by reference.

BACKGROUND OF THE INVENTION

Field of the Invention

The present invention relates to a measurement system, which comprises a force cell for detecting a support force in a support structure, particularly for detecting a support force in a support element which forms a part of the support structure. The support structure is applied to a statically erected crane, a supported working machine, a travelable crane vehicle, a travelable crane, a drilling vehicle, a self-propelled carriage, etc., which hereinafter are all referred to as a working machine or a machine.

Description of the Background Art

FIG. 1 schematically shows a crane vehicle 1, which is used at a fixed position and stands on a support element 2 during the work, and the support element may also be referred to as a support leg here. The support element 2 is located in a bottom region of outwardly extendable brackets 3, and the brackets are fixed on a frame 44 of the vehicle. Each of the brackets 3 is configured to be a retractable bracket, and the bracket may be disposed in a working position, where the bracket laterally stretches out of the vehicle, from the frame 44 by means of a linear motion with or without the aid of an external force. It is also possible for the bracket 3 to be pivotably configured such that the bracket 3 can, by the aid of an external force if necessary, pivotally move around a vertical or horizontal axis to move to the working position where the support laterally stretches out of the vehicle. End regions of the bracket may also move to the working position by means of the combined pivotal and telescopic motions. In this case, the bracket is length-adjustable (retractable) itself, and has one end thereof pivotably disposed on the vehicle. In another configuration, the bracket may also comprise a plurality of turnover links, so that the bracket may be turned over into the working position following a folding motion. The telescopic motion, pivotal motion and a combination thereof are covered by the term "outwardly extending motion (drawn out or stretched out)".

At the position of use, the whole crane vehicle (generally a machine) is preferably lifted up in a hydraulic manner by means of a support element 2, wherein the support element 2 may previously extend outwardly in a hydraulic manner onto the bracket 3 thereof. If there is a wheel, this is usually not in contact with the ground, but it at least reduces the load.

If the force vertically transferred to the ground via the support element is measured, the weight distribution of the whole system (i.e., the supported machine comprising the carried load) and therefore the center of gravity of the whole system may be determined, particularly when lifting the load. The measured value is configured to be used to determine the dumping point of the machine or the crane. It is possible to measure the support force in that a force cell is located in a line of force of each support element. Thus, the force cell outputs a signal corresponding to the respective support force, and the signal is analyzed by the above-mentioned method, for example.

Application EP 2159428, which corresponds to U.S. Pat. No. 8,516,945, shows a solution for coupling or connecting a sensor to a crane. The solution uses a sliding contact connection on a central tube to transmit signals. Using this solution may only achieve a single-pole solution. Hence, the vehicle mass body of the crane has to be used as a second pole. However, this will cause conduction current and failure in the case of wet ground or when it rains, and therefore in this regard, the signal will increase the burden of failure. Furthermore, in principle the danger is in that the connection within the cylinder block is interrupted by the open sliding contact.

Furthermore, a single line connection is unsuitable for common techniques requiring a multi-pole connection. Thus, a reliable connection, such as Canbus, needs at least five poles, and a 4-20 mA technique needs a two- or three-pole connection.

SUMMARY OF THE INVENTION

It is therefore an object of the present invention to provide a firm support force measurement system, which comprises a force sensor for a movable and outwardly extendable support element, which support force measurement system reliably provides a signal corresponding to a load (support force) carried by the support element.

In an exemplary embodiment according to the present invention, the support force measurement apparatus for measuring the support force on a movable support element of a support structure of, for example, a movable working machine comprises at least one measurement element which is connected to a deformation body deformable with an effect of the support force and sends a signal proportional to the support force, and comprises at least one electric connection for transmitting the signal proportional to the support force to an analysis apparatus. The support element and/or the support structure comprises at least one section adjustable between a static position and a working position, and wherein the relative position between the measurement element and the analysis apparatus changes. The electric connection is a cable which connects the sections of the support element or the support structure adjustable relative to each other, and the cable has its length changed following the relative position of the sections of the support element or the support structure and automatically returns to its initial length.

By using a multi-core cable, a plurality of terminals of the sensor can be connected to the analysis apparatus at the same time, and thus to perform energy supply and measured value acquisition at the same time. A plurality of measured values, such as support force and temperature, can also be detected simultaneously. Furthermore, the connection by means of a cable is more reliable as compared with the sliding contact connection, since the sliding contact connection is always subject to little wear.

The adjustable sections can be connected to a hydraulic piston/cylinder block apparatus, and the cable is arranged to pass through a cylinder block chamber of the piston/cylinder block apparatus.

The cable, on the one hand, can be connected to a fluid-tight current guide apparatus via a cylinder block wall, and on the other hand, is firmly connected, in electrical and mechanical manners, to the fluid-tight current guide apparatus through the piston.

The cable can be guided in a multi-piece retractable protection tube, wherein a segment on the respective end side of the retractable protection tube is connected to the bottom of the piston or the cylinder block.

The cable can have an initial shape, and the cable automatically returns to the initial shape following a relaxed strain, wherein the initial shape is in a spiral shape, a coiled shape, a corrugated shape, a jagged shape or a ring shape, or a combination thereof. For example, the required elasticity may be achieved by means of a cable cover or the corresponding configuration of the cable itself or by using a corresponding pre-deformed membrane cable.

The initial form of the cable, for example, the spiral initial shape of the cable, can be deformable in the manner of matching the inner diameter of the cylinder block, so as to guide the cable.

Similarly, the cable can be wound around the automatic winder, and the winder winds up the cable from both sides under an elastic force and preferably starting from the middle section.

The cable can be multi-core. In this way, different signals can be transmitted at the same time for analysis, and the signals may comprise a temperature signal and the like except the support force measurement signal.

The support structure can comprise a bracket extendable horizontally and outwardly and/or a support element which is arranged on an end portion of the bracket and is vertically adjustable in a hydraulic manner, wherein the deformation body is arranged together with the measurement element on the bracket and/or the support element. Particularly preferably, the support element comprises a hydraulic cylinder with a piston rod, wherein the deformation body forms a section of the piston rod.

Alternatively or additionally, the support element can include a support leg for being supported on the ground, wherein the deformation body is disposed in a connection section between the piston rod and the support leg or forms the connection section. Preferably, the connection section is a spherical link, while the deformation body is a constituent part of the spherical link.

The configuration of the deformation body can be selected so that the deformation body is deformable in the direction of the support force and is rigid in the opposite transverse direction.

The analysis apparatus may detect the outwardly extended length of the bracket, and uses the measured values in relation to the support force to perform calculation so as to determine the center-of-gravity position of the machine.

Additionally, the bracket can be supported at an outwardly extended position by a force measurement bolt which detects a machine side load of the bracket.

The bracket can be adjusted in a hydraulic manner by means of one or more piston/cylinder block apparatuses, and the cable can be arranged to pass through the piston/cylinder block apparatus.

In an embodiment according to the present invention, the support force measurement apparatus for measuring the support force on a movable support element of a support structure of, for example, a movable working machine comprises at least one measurement element which is connected to a deformation body deformable with an effect of the support force, so as to form a sensor and send a signal proportional to the support force, and comprises a support leg which comprises the sensor and is movably connected to the support element. The support element comprises a cable connection which is configured to conduct electrical energy and is used to send the signal proportional to the support force to an analysis apparatus in the machine. The support element in the support leg and the sensor are provided with electromagnetic interfaces; and the measurement element is supplied, by means of electromagnetic induction, with electrical energy from the machine through the electromagnetic interfaces, and the signal proportional to the support force is transmitted, by means of electromagnetic induction, from the measurement element to the cable connection of the support element.

In the apparatus, except the reliable cable connection, an interface can be used, which interface is corrosion-resistant and insensitive to moisture and also allows the replacement of the sensor or support leg at the installation position itself, for example.

The measurement element can be connected to a circuit, and the circuit comprises a rechargeable buffer storage device which is used for storing electrical energy and for the measurement of the support force and the transmission of the signal proportional to the support force.

The analysis apparatus in the machine can be matched up, so as to be used to switch, following the transmission of the signal proportional to the support force with a shift over time, between a charging operation for charging the buffer storage device and a measurement operation for measuring the support force, wherein the switching cycle is time-controlled or in relation to the charge state of the buffer storage device or to the measured value of the support force.

The transmission of energy and the transmission of the signal proportional to the support force can be performed at the same time in such a way that a modulated AC voltage is transmitted as a signal carrier through an electromagnetic interface.

The sensor can be mounted in a replaceable manner in the support leg. Therefore, during the maintenance, it is not required to perform disconnection or reconnection to replace the sensor or perform matching for the matched measurement, for example, matching other measurement fields or adding temperature measurement matching.

The support leg can comprise a spherical plate supported on the sensor, wherein the support element comprises a link ball accommodated in the spherical plate. The portion of the electromagnetic interface at the support leg side may be mounted in a depressed manner in a recessed portion of the spherical plate, and the portion of the electromagnetic interface at the support element side may be mounted in a depressed manner in a recessed portion of the link ball, so that the two portions are arranged opposite to each other in a non-contact manner.

In an embodiment according to the present invention, the support force measurement apparatus for measuring the support force on a support element of a support structure of, specially, a movable working machine comprises at least one measurement element which is connected to a deformation body deformable with an effect of the support force, so as to form a sensor and send a signal proportional to the support force, and comprises a support leg which comprises the sensor and is movably connected to the support element. The support leg comprises a device for storing electrical energy and a radio transmitter, which is connected to the sensor and constructed to transmit in a wireless mode the signal proportional to the support force detected by the sensor to a radio receiver in the machine.

A multi-channel, if necessary, expandable system can be used, so as to inform the analysis apparatus with the measured values, such as the support force, temperature, charge state or function. The system can be modified in a very simple way, because the control station of the machine only needs one continuous energy supply apparatus, which is generally already in the machine.

The device for storing electrical energy can be a rechargeable storage device, and the support leg can be provided with a charging apparatus by which the storage device may be charged. The following solution may also be considered, in which a non-rechargeable storage device may be used, and under normal circumstances, the duration of work is long enough so that, in the case of appropriate costs and environment protection, the non-rechargeable current storage device is used to send the measured signal with an adequate frequency.

The radio receiver in the machine can be connected to the analysis apparatus, and the analysis apparatus converts the signal proportional to the support force signal into a support load.

The radio transmitter and the radio receiver can be, for example, a radio transmitter and a radio receiver, configured and constructed to be in communication with each other. Preferably, the radio transmitter and the radio receiver are constructed to be used to transmit data by means of radio waves, to be coupled with each other according to a given protocol and to check the signal source and the correct transmission to the receiver of the machine.

The device for storing electrical energy can be connected to the charging apparatus, and the charging apparatus comprises a charging socket for connecting a current source or an interface for non-contact transmission of electrical energy by means of electromagnetic induction. The latter expanded solution particularly can be operated without short circuit in a dirty installation position and environment, because no electric contact portion is exposed.

The support leg can comprise an apparatus for monitoring the charge state of the device for storing electrical energy, which is constructed to transmit data regarding the charge state to the radio receiver of the machine by means of the radio transmitter.

The support can comprise an antenna of the radio transmitter, which is disposed in a recessed portion and is preferably cast with plastic.

The support leg can carrie a light-emitting apparatus, preferably an LED, on its upper side, which is controlled by the radio transmitter to display working states by light symbols. The light symbols can be distinguished by light colors or light-emitting intervals, particularly continuous lights and flash lights having different frequencies, and preferably show the different working states, e.g., particularly the ready-to-work, failure, interruption of radio contact, and the charge state of the storage device.

The expanded solution has the advantage of particularly likewise reminding the machine operator and other persons in a cab who may not be able to see with an alert that the working machine has a dangerous operation state.

The radio receiver can be disposed in a control station of the machine operator and comprises a screen, and a measured value and/or a value calculated from the measured value, e.g., particularly the allowable outwardly extended length and angle values of the crane bracket in the case of a moving crane, are shown on the screen.

The light-emitting apparatus and the described functions may be specifically applied to other forms of the present invention.

In view of the present invention, the problem regarding the transverse force shown by FIG. 2 is also concerned.

When lifting the vehicle by means of the support element and when lifting the load, the vehicle frame 44, the bracket 3 and the support element 2 deform, so that the end portions or support legs of the support element 2 standing on the ground shall be far away from each other in the horizontal direction d, as shown in FIG. 2. However, the moving part is prevented by means of the non-zero coefficient of friction between the ground and the support leg 2. Hence, a horizontal reaction force is formed between the support elements, which generates bending moments in all parts through which the line of force passes.

Now the problem of measurement technology lies in that each actual force cell or force sensor not only responds in a direction of the force configured by the force cell or the force sensor, but also more or less responds to the force and moment applied to same in all other directions. For example, in order to detect the center-of-gravity position of the vehicle or the crane supported by the support element, only the vertical force, i.e., the support force, is important.

The horizontal force appearing in the application described above, particularly the horizontal force on each support element, is an interference component in the measurement technology for the vertical force to be measured.

It is difficult to find out an appropriate mounting position of the force cell on the vehicle or crane. Regarding the crane or crane vehicle, the operating conditions are often harsh.

The cable connection and the sensor are exposed to contaminants. Furthermore, the support element in the outwardly extended state is also exposed to the mechanical stress and potential collision due to the operation of the machine and vehicle and the heavy equipment in the adjacent surrounding environment. Therefore, it is not allowed to limit or affect the safety and the ability to work.

The present invention provides solutions for the difficulties.

With the present invention, the force cell is integrated into the support element, so that it is firmly integrated into the structure while providing reliable signals.

Thus, the force cell is configured, in a form of the present invention, to be easily mounted on an end portion of the support portion, and to be subjected to less affection caused by the transverse force and moments and be good for countering the environmental influence, such as moisture and contaminants.

However, the force cell may also be integrated into the line of force of the support element at another position, such as at any position of the piston rod, for example.

Since the applications described herein are typically safety-related applications, it is further important that the force cell is characterized, in terms of measurement technology, by remaining unchanged for a long time and satisfying the minimum requirements for the functional safety.

Furthermore, such a vehicle equipped with the support legs is generally used outdoors. Here, for example, one side of the vehicle is under the sunlight, so that the support leg on this side is heated, while other support legs are in the shadows. Hence, a great temperature difference will be formed, which will distort the deformation or strain measured in the measuring sensor, particularly the measured resistance value (i.e., the force).

Advantageously, the force cell may comprise an additional temperature measurement, so as to carry a temperature-sensitive resistor, for example, which can achieve the direct temperature compensation on the measuring sensor. It is particularly advantageous that the sensor carrying a load measurement resistor is also adjacently provided with a temperature measurement resistor.

There are many different vehicles which comprise a mechanism requiring the use of support legs. Therefore, different maximum support loads are also expected and detected on the support legs. In order to achieve precise measurement in a corresponding nominal load range, the force cell is to be designed to be able to send, as far as possible, signals which uniformly change in the whole nominal load range. To this end, it is advantageous that the sensor can be replaced without establishing a conductive connection.

Furthermore, in order to avoid storing many different sensors (respectively matched up for the nominal load range), it is advantageous that a unique standard measurement element is used and that the deformable body of the sensor matches up, in its geometric structure, to the measurement tasks, i.e., the nominal load range.

The matching in the configuration of the deformation body may be well calculated and may also be manufactured, because preferably the diameter of the rotating member (the diameter of the cylinder block) is matched up, which may be achieved easily and precisely in practice.

In an embodiment of the present invention, the matching with different loads is designed such that different sleeves are covered by a standard deformable body, the sleeves having less deformation by increasing the cross section and thus eliminating a high load.

In an embodiment of the present invention, it is conceivable that the force sensor is integrated into the horizontal support structure of the bracket so as to improve the accuracy of the measured results. To this end, the sensor may be in the form of a measurement element connected to the deformation body and is mounted into the support structure by welding or press-fitting, for example, so as to measure the support force.

The expanded solution may be achieved by a reinforced structure which is additionally applied to the support structure and is connected thereto, so that the sensor is accommodated as an integrated element.

Here, it is advantageous that the whole reinforced part may be measured and tested as an assembly before disposed on the support element.

To this end, it is advantageous that the reinforced structure is weakened in a restricted manner around the force cell, so as to achieve herein the maximum and restricted strain locations to eliminate and measure the line of force or load at the measured position.

The matching with different loads is thus configured, for example, to apply the additional structure or restricted weakening with different intensities.

In an embodiment of the present invention, the force sensor can be integrated into the support leg of the support element below the lowest support plate and the spherical link. To this end, the sensor is disposed below a spherical accommodation part, and the spherical accommodation may be changed.

By different insertion portions with different ball diameters, matching for the corresponding crane vehicle may be rapidly performed.

The sensor may be a force sensor, which records the strain, i.e., the change in length, on the deformation body. This may be a resistance strain gauge which measures the strain or a coupling membrane which is strained, domed or deformed under the influence of a force. An optical method, particularly having fibers, may also be used herein, and the measurement method may measure the strain. Generally, different solutions are possible herein.

Another method for detecting the support force may be the hydraulic measurement element, which measures the pressure of the closed piston chamber and converting the pressure into a force output. When radio-transmitting the measured data, in the case of using the vehicle mass as a second pole, the energy supply may also be achieved by means of a single- or double-pole connection on the vehicle.

However, the sensor may also be implemented as a movable force measurement shaft which analyzes, according to the outwardly extended state or the outwardly extended length or width and angle, the support force applied by the outwardly extendable bracket of the movable machine. For example, the shaft bending or bearing force and the axial force at the support portion of the shaft acquired herein are analyzed.

The force sensor may also be a SAW sensor or a sensor with an RFID function, which is excited as an oscillation circuit by the wave and subsequently independently sends a resonance response. To this end, it is required that the support legs together issue a coded address to prevent confusion of the measured values.

In this case, the force sensor may be preferably queried by the support leg and its spherical link by means of radio, for example, inductive connection.

To this end, an appropriate transmitting and receiving apparatus is integrated into a ball body and an accommodation plate of the support leg, which realizes the transmission of the measured values or the transmission of energy for driving the sensor.

In an embodiment of the present invention, each force sensor and analysis apparatus communicate by means of a transceiver mounted on the machine side, and the transceiver transmits data as required by mutual transmission and postback combined with a check algorithm.

It is especially advantageous that, by the double-line implementation from the support leg to the monitoring apparatus (analysis apparatus) of the crane (machine), energy supply is conducted, and simultaneously the measured signal is modulated in a clock-controlled manner in an analog or digital mode onto the supply voltage or the supply current.

Optionally, the CAN bus is configured by connecting five poles or achieved by a plurality of channels by means of radio.

During the radio transmission, particularly the display in a crane cabin on a rotary crane may be simply modified, because the contact portion of the sliding contact is not required. Only a current supply apparatus is required, and the analysis apparatus comprising a receiving unit and a display may be simply modified and disposed in the crane driver's field of vision.

The light-emitting apparatus on the analysis apparatus or on each support plate may visually confirm on the spot that correct connection and mounting are displayed.

For simply operating and mounting the sensor system, a foot plate is closed from the upper part by means of a screwable closing member, or has its upper part open and only simply locked, and otherwise is fastened in a charging and conveying apparatus on the vehicle during the transportation.

In an expanded solution of the present invention, the force sensor is integrated into the piston rod of the support leg.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIGS. 4A to 4G show various electrically coupling apparatuses used for the sensor and passing through the support leg;

DETAILED DESCRIPTION

Figure 1:
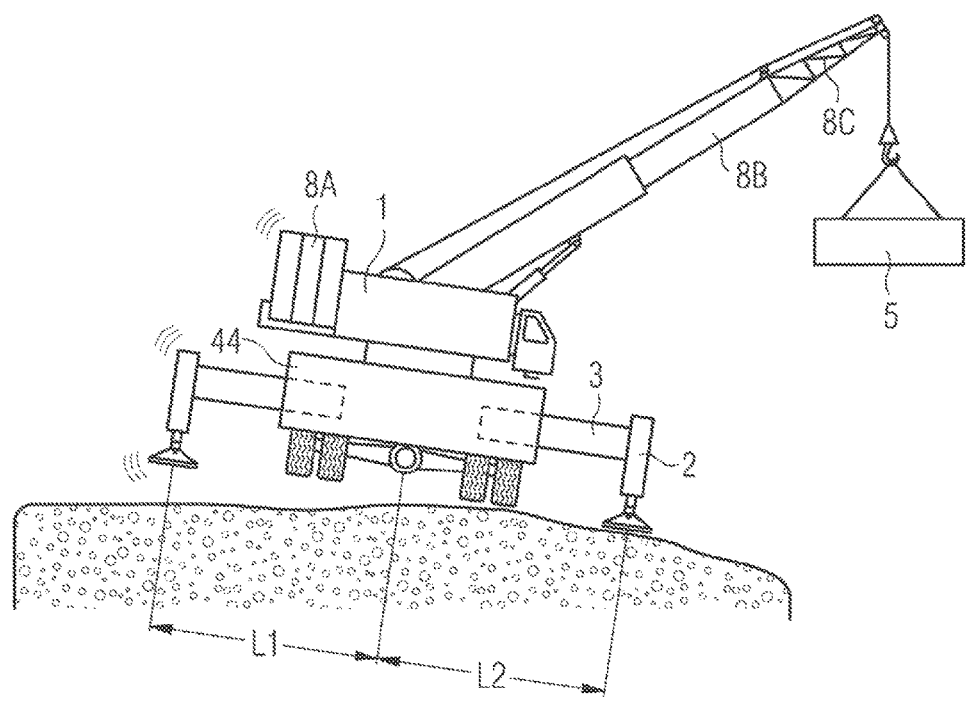
FIG. 1 shows, in a front view, one of the support elements on a crane vehicle.

According to FIG. 1, a rotatable crane 1 (the crane is a machine in the sense of the present application) comprises a basic frame or a lower structure 44 which is fixed to a horizontally movable crane jib or bracket 3. A support leg 2 is mounted on the bracket 3, and the support leg may lift up the crane structure or the entire vehicle in a restricted manner.

According to a suspended load 5, the outwardly extended length of the crane bracket (column 8B), the expanded extension portion 8C, the arrangement of the self-weight of the crane and a balance weight 8A, and the outwardly extended length L of the bracket 3 with the support leg 2, the maximum load of the load 5 to be lifted before the dumping of the crane is obtained.

By analyzing support forces of all the support elements, approaching or reaching the maximum load (also referred to as an overload limit) may be shown to a crane driver.

To this end, a sensor is arranged in the support structure.

Figure 2A:
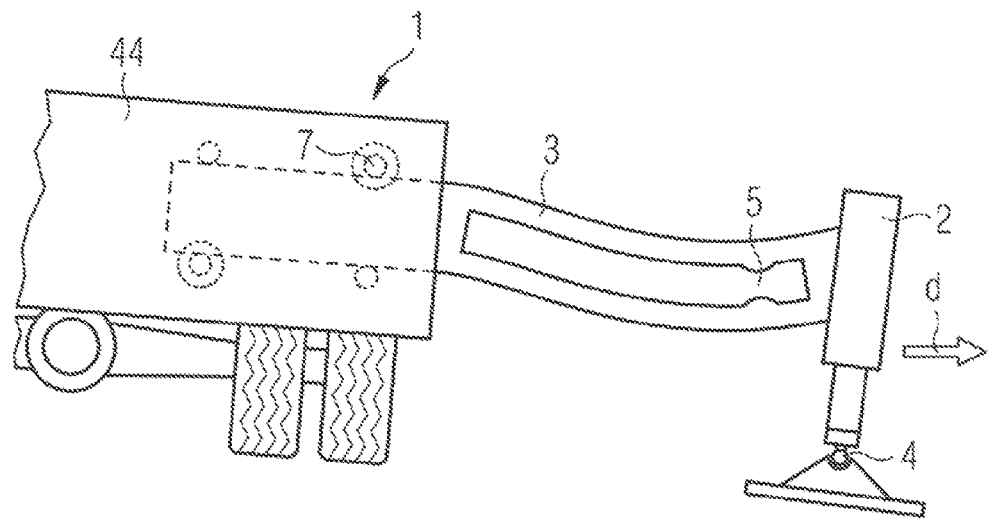
FIG. 2A shows a bracket, which comprises a schematically illustrated deformable part and a reinforced structure.

According to FIG. 2A, the force sensor may be disposed at different points in the support structure. For example, in the support element, the force sensor may be disposed on the support leg 2 in the region of a ball 4, on the reinforcement element 5 on the bracket 3, or in a tray roller shaft 7 of the bracket 3. The present invention may be applied to these applications, preferably to the application in which the sensor and the analysis apparatus can move relative to each other.

Figure 2B:
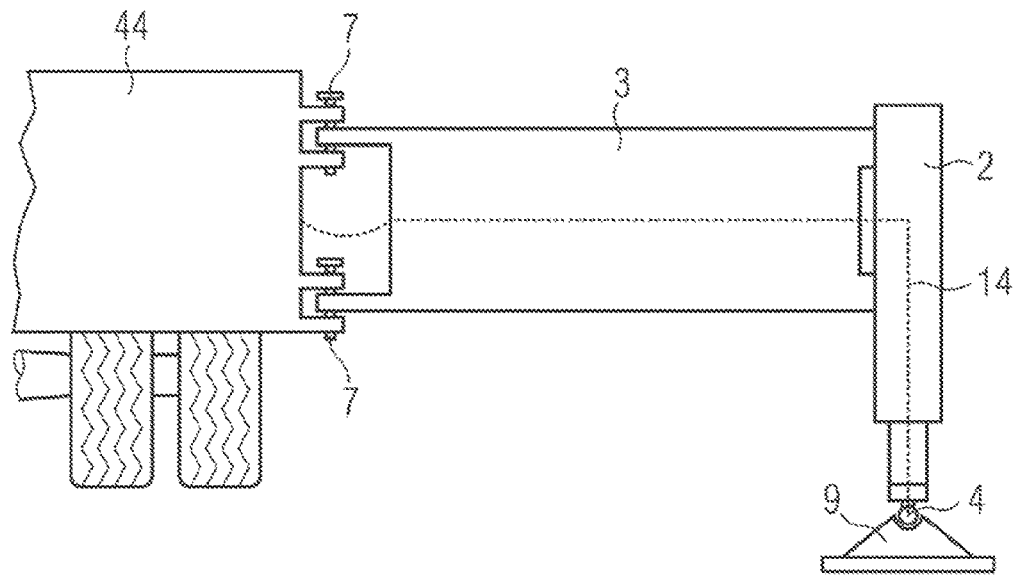
FIG. 2B shows a bracket, which may be pivoted around a vertical axis out of the vehicle.

The following solution is shown in FIG. 2B, in which the bracket 3 may pivot out of the vehicle around a vertical axis. A journal 7 around which the bracket 3 pivots may be implemented as a force measurement shaft. Furthermore, other force sensors may be arranged in the region of the ball 4 of the support leg 2 or in the support plate 9 as described below and connected to the analysis apparatus of the crane in the described manner.

Figure 2C:
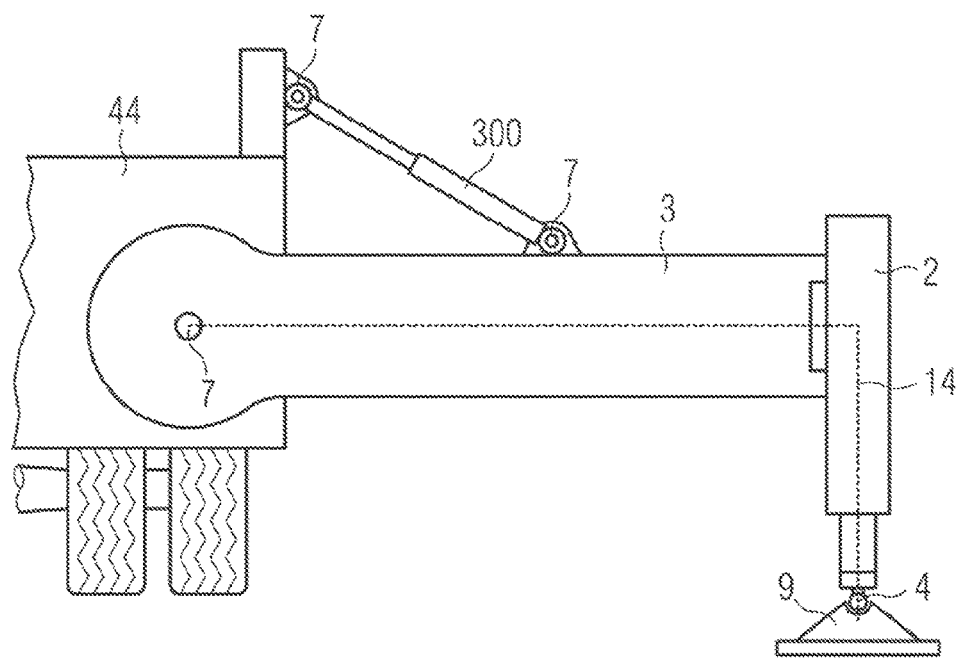
FIG. 2C shows a bracket, which may be pivoted around a horizontal axis out of the vehicle.

The following solution is shown in FIG. 2C, in which the bracket 3 may be driven by a hydraulic cylinder 300 to pivot out of the vehicle around the horizontal axis. A hinge joint 7 around which the bracket 3 and the hydraulic cylinder pivot may be implemented as a force measurement shaft. Furthermore, other force sensors may be arranged in the region of the ball 4 of the support leg 2 or in the support plate 9 as described below and connected to the analysis apparatus of the crane in the described manner.

Figure 3:
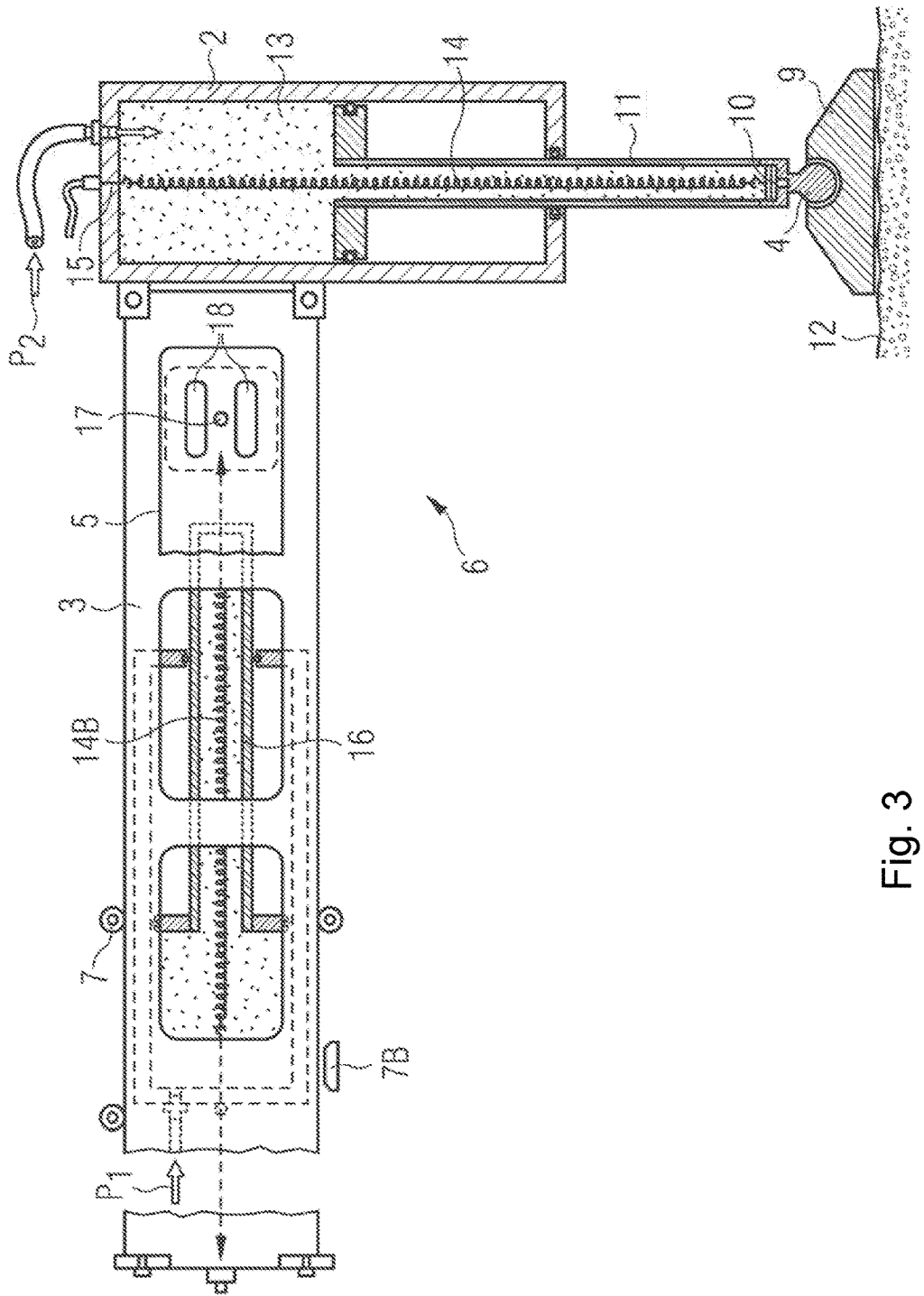
FIG. 3 shows a bracket, which has a sensor and can hydraulically extend outwardly, and a support leg which comprises a sensor at the lower foot part.

FIG. 3 shows two sensors which may work redundantly with each other on the support structure 6 with the bracket 3 and the support leg 2 and therefore improve the safety of the crane.

The support structure 6 is mainly composed of a horizontal bracket 3 and a vertical support leg 2. The crane vehicle, as shown in FIG. 1, is generally provided on each of the two vehicle sides with two such apparatuses, i.e., there are four support legs 2 on four brackets 3 in total.

Merely described below is such a support structure, which is copied by arranging the support structures having the same structure or radial configuration on the rest vehicle points.

To this end, the first force sensor 10 is arranged above the spherical link 4 on the foot, and the support plate 9 accommodates the spherical link. The support leg 2 is manufactured in two pieces as a hollow cylinder block with the movable piston 11. By guiding hydraulic oil 13 under a pressure P2, the piston rod 11 moves until the support plate 9 comes into contact with the ground 12 and lifts the crane.

The force sensor 10 makes contact herein via a spiral cable 14 for example, and the spiral cable passes through, preferably centrally passes through, the piston and cylinder block unit. The measured signal is then transferred to a crane control apparatus or a crane monitoring apparatus via a sealed contact portion 15.

Likewise, it is possible that the bracket 3 moves in a hydraulic manner by means of a piston and cylinder block unit 16, the piston and cylinder block unit is supported in the bracket 3, and the bracket 3 may retract or stretch on a roller 7 or a sliding support plate 7B relative to a lower structure of the crane which is not shown herein in detail.

The bracket sensor 17 is then preferably, as a constituent part of the plate 5, disposed on the bracket 3 by welding, for example. A recess surrounding the bracket sensor 17 surrounds the lines of force or concentrates same at the support leg sensor and improves the measured signal.

Similar to the implementation for the support leg 2, a cable 14B of the bracket sensor 17 is guided to pass through a hydraulic oil and pass through the piston and cylinder block unit to the crane control apparatus. It is further possible that the cable 14 is electrically connected to the cable 14B of the support leg 2, so that the cable 14B guides the measured value of the force sensor 10 and the measured value of the support leg sensor 17 to the analysis apparatus (not shown) of the crane 1.

According to FIG. 4, to this end, the cable may be in different configurations:

FIG. 4A shows a cable connection, in which the cable is spirally formed and is coated with a material so as to elastically spring back, and is predefined in the initial shape thereof, so as to always try to return to its initial shape from the length when the load is reduced.

An enveloping shape herein, e.g., a tube (which may also be implemented as an extension tube (not shown, see FIG. 7)) takes assisting and guiding effects, in which each end section of the extension tube is fixed onto the cylinder block or the piston rod, and a variable-length protection cover is formed surrounding the elastically deformable (i.e., capable of automatically returning to the initial shape thereof) cable.

FIG. 4B shows a cable connection, in which the cable is coiled by an apparatus not shown when the load is reduced. This may be an elastically pre-tensioned roll-up device.

FIG. 4C shows a cable connection, in which the cable is wound in zigzag fashion by an apparatus not shown.

FIG. 4D shows a cable connection, in which the cable flexibly matches the change in length in the form of a simple (spiral) spring. The cable is reinforced herein by means of a metal or fibrous liner or wrapper, so that the spiral shape thereof, such as a spring, symmetrically matches the extension portion.

FIG. 4E shows a cable connection, in which the cable predefines a film conductor or a ribbon conductor in an accordion form. To this end, an insulated printed conductor may also be used as a film to connect with a spring elastic carrier material, for example, by lamination method, to connect with a printed circuit board material.

FIG. 4F shows a cable connection, in which the cable has elastic spring folding elements, and once the connection load is reduced, the spring folding elements roll up inwards by pre-tensioning.

According to FIG. 5, the force cell or the force sensor is configured to be a spherical link or a section of the spherical link 4, is mainly formed of a rustproof iron deformation body, and performs detection by the strain induced by the force to be measured by means of a resistance strain gauge adhered to the deformation body or by means of a strain-sensitive resistor fabricated by the thin-layer technique.

To this end, the resistor may be directly arranged on the ball link or disposed on the sensor body 20, and is connected to the deformation body, preferably by welding. When guiding the support force F to a connecting plate 21, the sensor region or a sensor body 20 deforms similar to the load F, the resistor deforms, and the measured signal for the load on the spherical link may be analyzed by the crane control apparatus.

The sensor device and the matching between the arisen strain and the desired force may be achieved by the configuration of a hole 22. The sensor device further matches the maximum load or the support geometrical structure of the crane in that the connecting diameter 22 of the spherical link section of different sleeves 23A, 23B is connected to the connecting plates 21A, 21B which are matched in strength.

By selecting the sleeve and the plate, the stiffness of connection may be changed, so that the strain level in the sensor region may be matched up according to the load.

In order to achieve a higher functional safety, regarding the wiring of the resistor arranged on the sensor body 20, there are two or more Huygens bridges connected in the same way on the sensor body, and the signals thereof are separately analyzed and evaluated in an electronic comparison circuit.

Furthermore, the resistor related to temperature is directly located on the sensor body, by which the influence of the temperature on the measured value may be compensated.

Figure 5B:
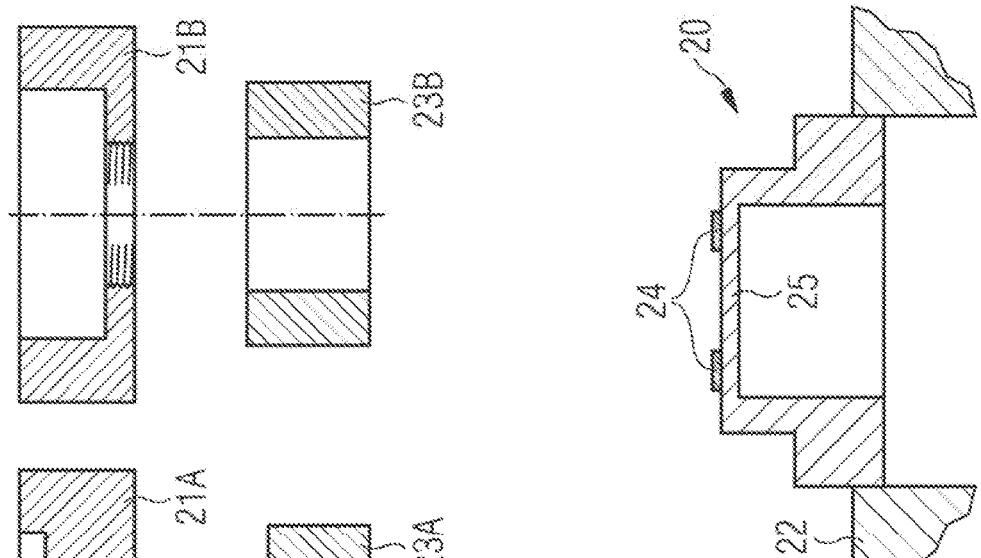
FIG. 5B shows an enlarged view of the sensor body.

If the spherical link 4 is cooperatively configured, for example, as shown in FIG. 5B, when a measuring resistor 24 is located on a measurement film 25 (which is a constituent part of the sensor body 20) which is connected to the spherical link, the horizontal force guided by the support leg to the sensor body 20 results in a deformation of the sensor region or the sensor body, which is analyzable in the measurement technology. Therefore, the force cell for detecting the support force transferred by a support element for carrying a load may be configured to compensate for the transverse interferential force. Thus, it will be achieved particularly by the way of appropriately (for example, crosswise) arranging the resistor on the sensor body 20.

The force cell or the force sensor comprises a measurement section (which is the measurement film 25 herein) or a deformation body which deforms under the support force and the transverse force in a direction deviating from the support force, and the force cell or the force sensor forms a part of the support element together with the measurement section or the deformation body. Furthermore, a plurality of resistors arranged on the measurement section (measurement film 25) are firmly connected to the measurement section, and the measurement section displays a response proportional to the strain and preferably counteracts the response proportional to the transverse force.

The elimination of the response may be achieved by appropriately arranging the measurement element (which is a film resistor herein) on the measurement section and/or by correspondingly processing the measured signals.

FIGS. 6(A, B, C, D) show a foot plate 9 for the support structure of the crane, which may be implemented, for example, as described with reference to the above figures.

In the expanded solution according to FIG. 6, the accommodation region 30 for the spherical link 4 is configured in a replaceable manner. Particularly, to this end, the sensor insertion portion 31 is provided with a sectioned spherical surface 32, and guides the support force of the spherical link 4 with a diameter D1 to the force sensor 33 in the support leg 9.

Figure 6A:
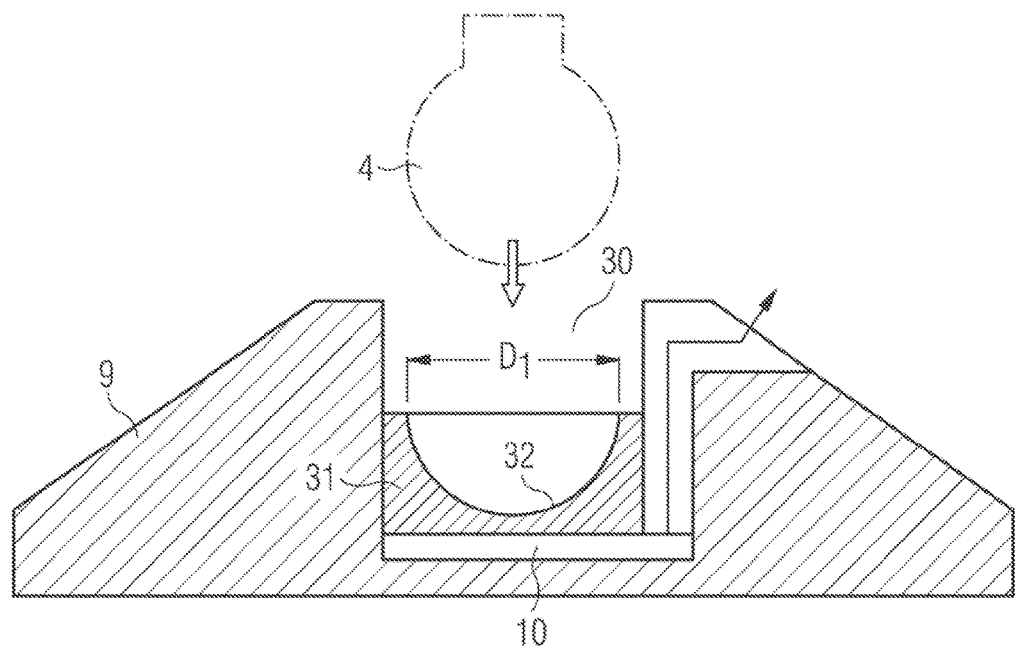
FIGS. 6A and 6B show support legs with a sensor insertion portion for different spherical links.
Figure 6B:
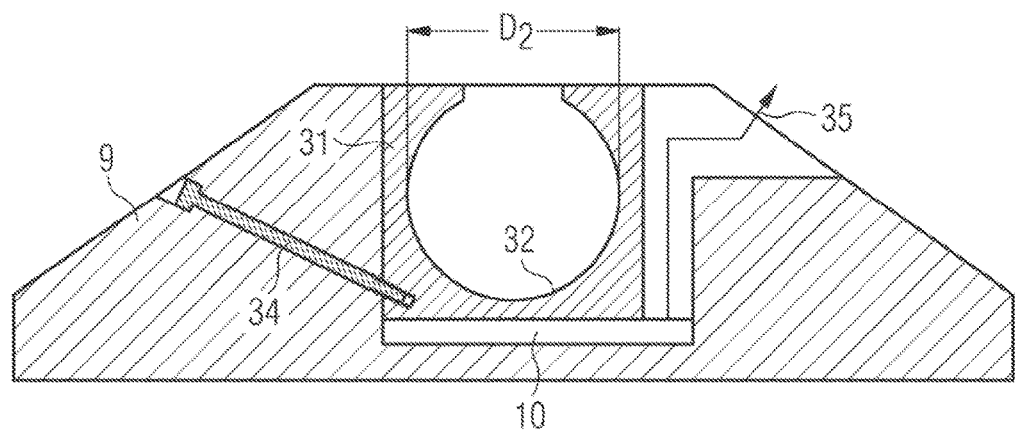

According to FIG. 6B, such a sensor insertion portion 31 may be locked with a fixing apparatus 34 in the support leg 9, and has an interface which will be described later and only shown similar to a connection unit 35, and the measured data may be sent to the crane control apparatus or an analysis unit through the interface.

To this end, the first force sensor 10 is arranged above the spherical link 4 on the foot, and the support plate 9 accommodates the spherical link.

Figure 6C:
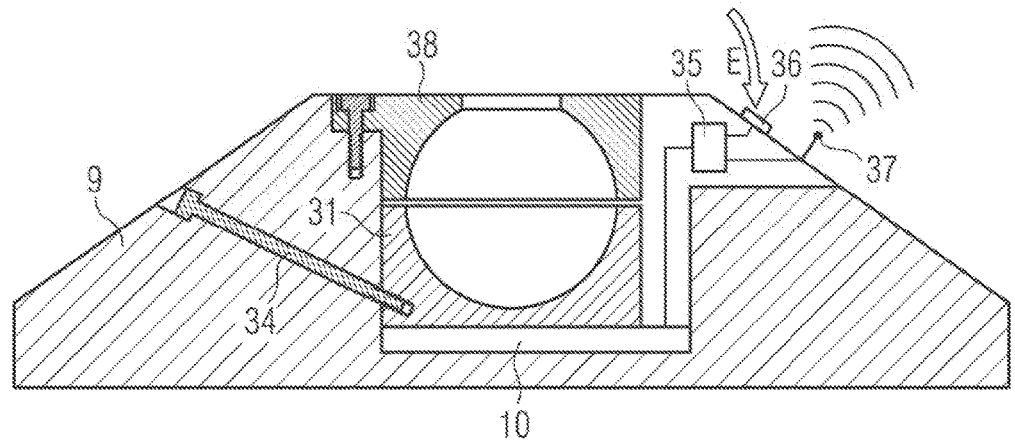
FIG. 6C shows a support leg in a wireless connection with a crane control apparatus.

According to FIG. 6C, the sensor insertion portion 31 connected to the force sensor 10 is provided with a connection unit 35, and the connection unit is configured as a radio transmitter and sends the measured data to the analysis unit or the crane control apparatus by means of radio, preferably via an antenna 37. The required energy supply may be wirelessly transferred via a receiving unit 36, for example, via an inductive interface.

The apparatus 34 is used to fix the sensing insertion portion 31 into the support leg 9, and the apparatus 38 herein is in the form of an upper hemispherical shell for fixing the support leg 9 onto the spherical link 4.

Figure 6D:
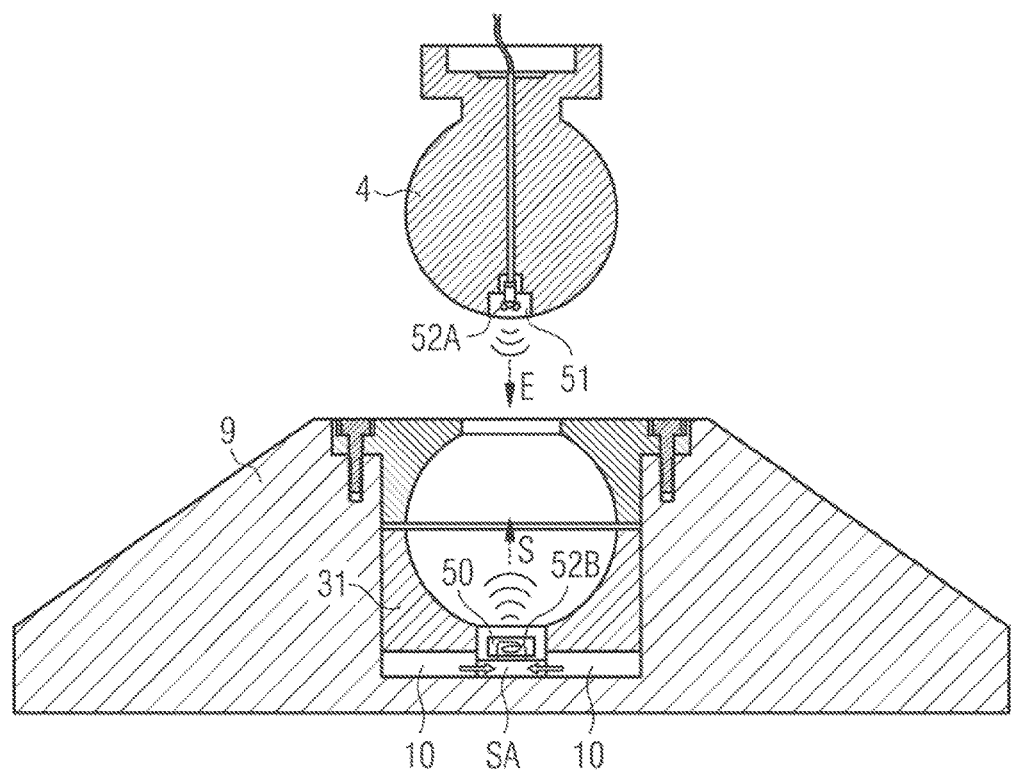
FIG. 6D shows a support leg in a radio connection with a crane control apparatus.

According to an embodiment of FIG. 6D, such a sensor insertion portion 31 transfers the support force to a double redundant force sensor 10, and the force sensor transfers the measured data thereof to a sensor analysis apparatus SA. The sensor analysis apparatus SA further wirelessly provides the measured data from a transceiver 50 to a transceiver 51, and the transceiver 51 operates as a receiver in the inductive interface and is disposed in the spherical link 4. The transceivers 50, 51 together form inductive interfaces.

In the scope of connection, it is integrated with coil systems 52A, 52B, and also transmits electrical energy for supplying power to the force sensor 10. In the embodiment, the force sensors do not need to be present in double, which may also be only a single force sensor 10, and is connected to the corresponding circuit SA, so as to transmit the measured data thereof through the inductive interfaces 50, 51.

The circuit SA connected to the coil system 52B and the force sensor 10 also comprises a device for storing electrical energy, which is in the form of a storage battery or a capacitor. The electrical energy may be transmitted through the inductive interfaces 50, 51, so as to subsequently drive the force sensor 10 to perform measurement and process the measured signal into an appropriate signal to be transmitted to the analysis apparatus of the machine or coupled and output into the interfaces 50, 51. Hence, the interfaces 50, 51, for example, may be alternately used for transmitting energy or for transmitting the measured value. Hence, a simple double-core cable and/or a simplified signal transmission form may be used to work.

Figure 5A:
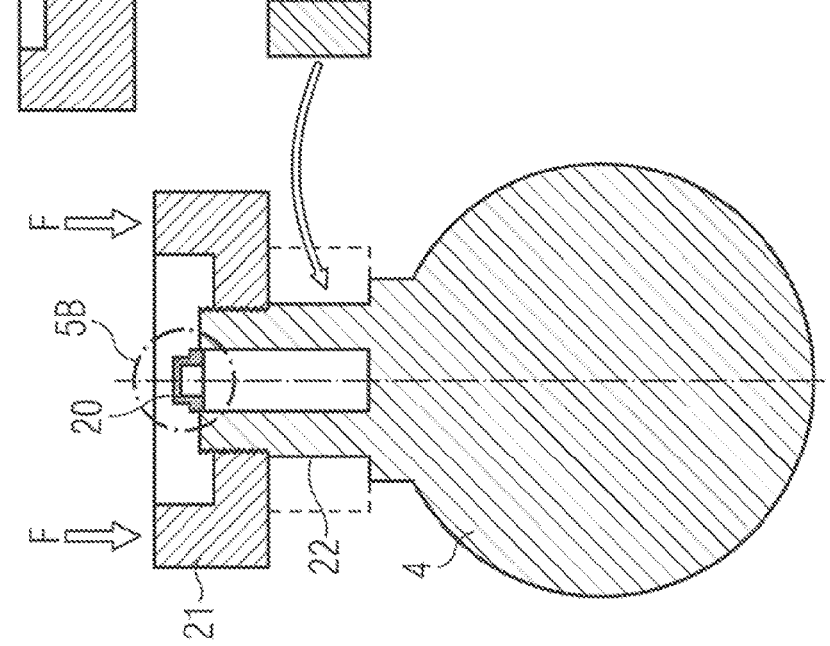
FIG. 5A shows a sectional view of the support leg which has a sensor element and a sleeve used for matching up the maximum load.
Figure 7:
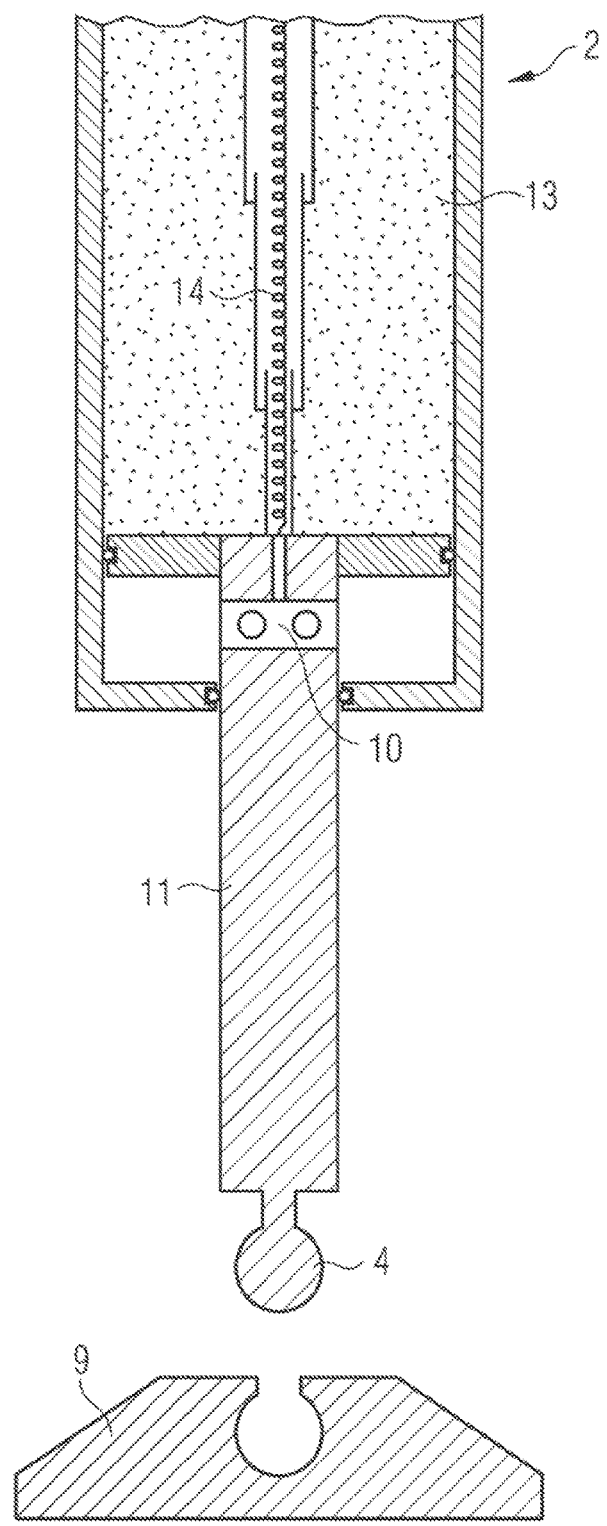
FIG. 7 shows a schematic sectional view of a support leg which comprises a sensor in a piston rod of a hydraulic cylinder.

Another embodiment is shown in FIG. 7, in which the support leg 2 is integrated with a force sensor 10. According to FIG. 7, the force sensor 10 is integrated into the support leg 2 or mounted on an upper end portion inside the piston rod. A section of the piston rod 11 forms a deformation body, and a sensor (not shown) is disposed on the deformation body. The sensor may, for example, have the form as shown in FIGS. 5A and 5B.

The cable connection 14 is accommodated and guided in a retractable protection tube 67, and therefore is specially protected from damage. It is ensured by the tube that the cable, as an electric signal connection, is always orderly loosely folded or disposed in a tube system without being held or squeezed.

The cable to the force sensor 10 may be implemented as shown in FIGS. 4A to 4G.

The expanded solution according to FIG. 7 may also change, so that the force sensor 10 is fixed onto a section of the piston rod 10 connected to the interior of the cylinder block. The arrangement has the advantage as follows: the electric connection to the force sensor 10 is in the interior of the cylinder block, and no cable has to pass through the piston.

Figure 8:
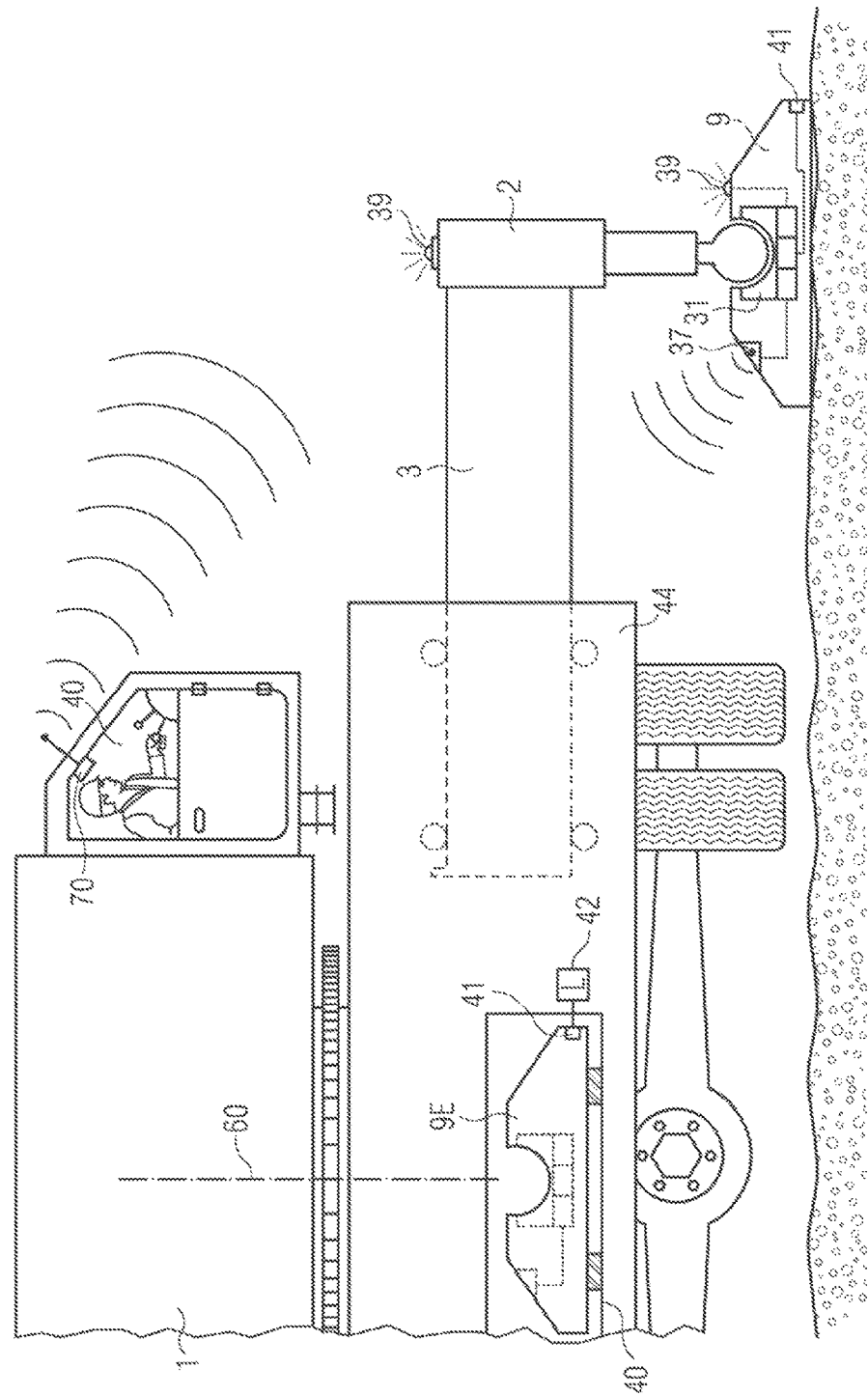
FIG. 8 shows a crane vehicle comprising mountable support legs, the support legs sending measured values to a crane cabin by means of radio.

FIG. 8 shows another embodiment. The crane 1 comprises a bracket 3 and a support leg 2. The support plate 9 is arranged on the support leg 2 and comprises a measurement insertion portion 31, which sends the measured value of a support force to an analysis unit 38 to an operation cabin 40 of the crane 1 by means of an antenna 37 which is flush with and integrated into the support plate 9.

Since the measured data is transmitted wirelessly by means of radio, particularly in the case of a rotatable crane structure, other electric rotation connection is not required in the region 60 where the crane is rotatably connected to the frame 44.

The radio transmission system between the support legs may be particularly designed so that the signal transmission is checked bidirectionally for many times, so that the signal transmission of the transmitted signal is particularly safe.

Furthermore, high accuracy can be achieved by encrypting, for example, a Hamming distance H=4. In the wireless system, each of the transmitting and receiving units has a definite address, so as to not only always associate the correct measured value with the correct support leg, but also automatically identify, by means of an appropriate apparatus, whether the corresponding correct support plate 9 is mounted on the correct support leg 2.

If all the support legs use the same support plate, a programming function is set, and used to determine the association between the support leg and the corresponding bracket in the analysis apparatus. When no prescribed association occurs, the corresponding safety query can prevent/delay/limit the operation of the crane. It is also possible that the support leg is provided with a RFID chip as a support leg mark, which comprises a mark for the corresponding support leg. After arranging the support plate 9, the measurement insertion portion 31 wirelessly detects the support leg mark and registers, as the support plate of the corresponding bracket, at the analysis apparatus of the machine. The RFID chip and the apparatus for detecting same may, for example, be mounted on the spherical link 4 or the measurement insertion portion 31, as shown in FIG. 6D.

Preferably, the whole system can be modified, the system is composed of the support leg plate 9 and an analyzing and warning unit 70 which may be disposed in the field of view of the operator in the operation cabin 40, and the analyzing and warning unit comprises an analysis apparatus and a radio connection system. Particularly, the support leg plate 9 comprises a special current supply apparatus composed of two energy storage devices, the energy storage devices can be charged by a charging terminal 41, and the charging terminal may also be implemented as a waterproof inductive interface. The analyzing and warning unit merely needs an on-board current, which is generally already provided in the operation cabin 40 (on-board socket).

Optionally, the disposed measurement system or foot plate 9 comprises a light-emitting apparatus 39, which is displayed in an optical mode when correctly operating, arranging and protecting radio transmission, and the system is ready for operation. An optical display of the light-emitting apparatus 39 comprises light symbols, which can be distinguished by light colors or light-emitting intervals, particularly continuous lights and flash lights having different frequencies, and preferably show the different working states, e.g., particularly the ready-to-work, failure, interruption of radio contact, and the charge state of the storage device.

Once the foot plate 9 is correctly mounted and/or locked in a transport and charging notch 40 of the crane, a charging terminal 41 on the foot plate 9 is connected to a charging unit 42 on the crane. It may also be possible that the in situ recharging for the foot plate is in the insertion portion, which may be achieved particularly by a portable recharging unit, which is connected to the charging terminal of the support leg to be recharged. The waterproof and contaminant-proof connection herein, such as an inductive connection, is advantageous.

Figure 9:
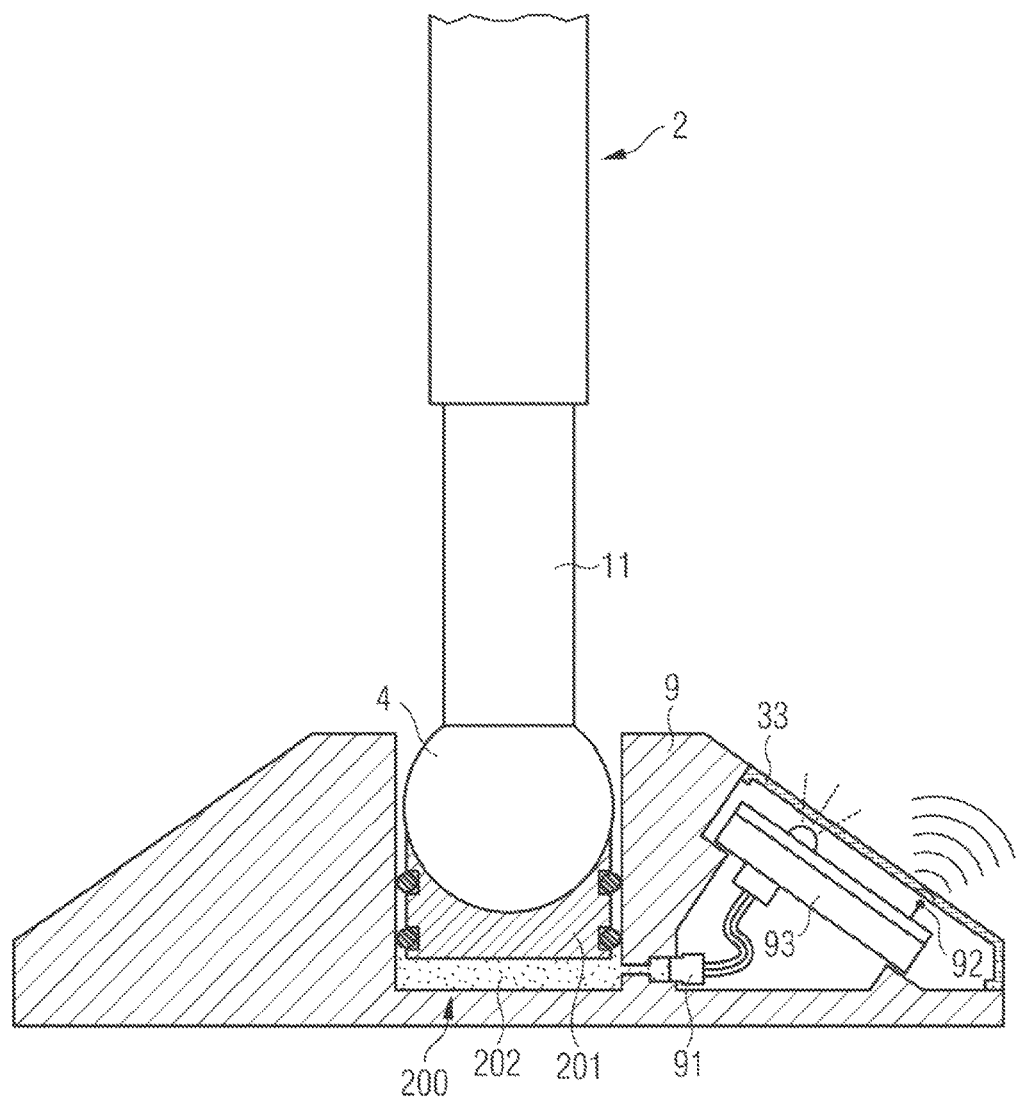
FIG. 9 shows a solution, in which the force sensor is formed by a piston/cylinder block apparatus and a pressure measurement apparatus.

FIG. 9 shows a solution, which uses a force sensor 200 to measure the support load, and the force sensor measures the pressure of a liquid in a cylinder block chamber 202 and deduces therefrom the support force applied, by a piston rod 11, to a measurement piston 201 which works together with the cylinder block chamber 202. For measuring the pressure, a pressure sensor 91 is used, which is connected to an analysis apparatus 93, and the analysis apparatus comprises an antenna 92. The measured value of the pressure or the calculated force value may be sent by the analysis apparatus 93 to the display or the analysis apparatus (70 in FIG. 8) in the operation cabin of the machine by means of radio signals. Preferably, the sensor structure form is provided with a temperature measurement apparatus (not shown), which determines the liquid temperature so as to consider the temperature when determining the support force.

Preferably, the measurement apparatus may send an optical signal regarding the correct installation or regarding the forthcoming overloading or a warning flash light as a warning for collision by means of a semitransparent cover plate 33.

The structure form of the support leg is different from the other embodiments merely in the structure form of the force sensor. Therefore, these implementations may also be equipped with an inductive interface or a cable connection and the force sensor 200 of such fluid dynamics.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. A support force measurement apparatus for measuring a support force on a support element of a support structure of a movable working machine, the apparatus comprising:
    at least one measurement element, which is connected to a deformation body deformable with an effect of the support force, so as to form a sensor and send a signal proportional to the support force; and
    a support leg, which comprises the sensor and is movably connected to the support element, the support element comprising a cable connection, the cable connection guiding electrical energy and being used for sending the signal proportional to the support force to an analysis apparatus in the machine,
    wherein the support element in the support leg and the sensor are provided with electromagnetic interfaces,
    wherein the measurement element is supplied via electromagnetic induction with electrical energy from the machine through the electromagnetic interfaces, and
    wherein the signal proportional to the support force is transmitted via electromagnetic induction from the measurement element to the cable connection of the support element,
    wherein the support leg comprises a spherical plate supported on the sensor,
    wherein the support element comprises a link ball which is accommodated in the spherical plate,
    wherein the portion of the electromagnetic interface at the support leg side is mounted in a depressed manner in a recessed portion of the spherical plate, and
    wherein the portion of the electromagnetic interface at the support element side is mounted in a depressed manner in a recessed portion of the link ball, so that the two portions are arranged opposite to each other in a non-contact manner.

2. The support force measurement apparatus according to claim 1, wherein the measurement element is connected to a circuit which comprises a rechargeable buffer storage device for storing electrical energy, and wherein the buffer storage device is used for the measurement of the support force and the transmission of the signal proportional to the support force.

3. The support force measurement apparatus according to claim 2, wherein the analysis apparatus in the machine is matched up, so as to be used to switch, following the transmission of the signal proportional to the support force with a shift over time, between a charging operation for charging the buffer storage device and a measurement operation for measuring the support force, and wherein the switching cycle is time-controlled or in relation to the charge state of the buffer storage device or to the measured value of the support force.

4. The support force measurement apparatus according to claim 2, wherein the transmission of the energy and of the signal proportional to the support force are performed substantially simultaneously via a transmission of a modulated AC voltage as a signal carrier through the electromagnetic interfaces.

5. The support force measurement apparatus according to claim 1, wherein the sensor is mounted in a replaceable manner in the support leg.

6. The support force measurement apparatus according to claim 1, wherein the support element comprises sections which are adjustable relative to each other.

7. The support force measurement apparatus according to claim 6, wherein the support element is in the form of a hydraulic piston/cylinder block apparatus, a cable is arranged to pass through the piston/cylinder block apparatus, and the cable has its length changed with the adjustment of the relative position of the piston and the cylinder block and automatically returns to its initial length.

8. The support force measurement apparatus according to claim 1, wherein a cable has an initial shape, and the cable automatically returns to the initial shape following a relaxed strain, wherein the initial shape is in a spiral shape, a coiled shape, a corrugated shape, a jagged shape or a ring shape, or a combination thereof.

9. The support force measurement apparatus according to claim 1, wherein, a cable is wound around an automatic winder, and the winder winds up the cable from both sides under a spring force.

10. The support force measurement apparatus according to claim 9, wherein the winder winds up the cable from both sides under the spring force starting from the middle section.

11. The support force measurement apparatus according to claim 1, wherein the sensor is formed by the deformation body, the deformation body is used as the measurement element to form a resistance strain gauge, or is formed as a coupling membrane element together with a resistance strain gauge, or
    wherein the sensor, as a hydraulic force sensor, is formed by a measurement piston which functions in a cylinder block chamber, and the pressure in the cylinder block chamber is output as a measured value of the support force, or
    wherein the sensor is used as a force measurement shaft to analyze the support force applied by a bracket of the movable machine and analyzes herein the bending of the shaft or an axial force on a support portion of the shaft.

12. The support force measurement apparatus according to claim 1, wherein the at least one measurement element is configured to counteract the effect of a transverse interferential force.

13. The support force measurement apparatus according to claim 1, wherein the sensor is redundantly arranged.

14. The support force measurement apparatus according to claim 1, wherein the signals from the sensor are analyzed and evaluated independently of each other.

15. A support force measurement apparatus for measuring a support force on a support element of a support structure of a movable working machine, the apparatus comprising:
- at least one measurement element, which is connected to a deformation body deformable with an effect of the support force, so as to form a sensor and send a signal proportional to the support force; and
- a support leg, which comprises the sensor and is connected to the support element in a movable manner; and
- a foot plate which is connected with the support leg,
- wherein the support leg comprises a device for storing electrical energy and a radio transmitter, the radio transmitter being connected to the sensor and transmits in a wireless mode the signal proportional to the support force detected by the sensor to a radio receiver in the machine,
- wherein the foot plate comprises an insertion portion connected to the force sensor,
- wherein the insertion portion is provided with a connection unit, and
- wherein the connection unit is configured as the radio transmitter and comprises an antenna.

16. The support force measurement apparatus according to claim 15, wherein the device for storing electrical energy is a rechargeable storage device, and the support leg is provided with a charging apparatus by which the storage device can be charged.

17. The support force measurement apparatus according to claim 15, wherein the radio receiver in the machine is connected to the analysis apparatus, and wherein the analysis apparatus converts the signal proportional to the support force into a support load.

18. The support force measurement apparatus according to claim 15, wherein the radio transmitter and the radio receiver are respectively configured and constructed to be a radio transmitter and a radio receiver in communication with each other.

19. The support force measurement apparatus according to claim 18, wherein the radio transmitter and the radio receiver transmit data by radio waves, are coupled with each other according to a given protocol, and check a signal source and a correct transmission to the receiver of the machine.

20. The support force measurement apparatus according to claim 15, wherein the device for storing electrical energy is connected to the charging apparatus, and the charging apparatus comprises a charging socket for connecting a current source or an interface for non-contact transmission of electrical energy by electromagnetic induction.

21. The support force measurement apparatus according to claim 15, wherein the support leg comprises an apparatus for monitoring the charge state of the device for storing electrical energy, which transmits data regarding a charge state to the radio receiver of the machine by the radio transmitter.

22. The support force measurement apparatus according to claim 15, wherein the support leg comprises an antenna of the radio transmitter, the antenna being disposed in a recessed portion.

23. The support force measurement apparatus according to claim 15, wherein the support leg carries a light-emitting apparatus on its upper side, which is controlled by the radio transmitter, so as to display working states by light symbols.

24. The support force measurement apparatus according to claim 23, wherein the light symbols are distinguishable by light colors or light-emitting intervals and display the different working states.

25. The support force measurement apparatus according to claim 15, wherein the radio receiver is disposed in a control station of a machine operator and comprises a screen, and a measured value and/or a value calculated from the measured value are shown on the screen.

26. The support force measurement apparatus according to claim 15, wherein the sensor is formed by the deformation body, and the deformation body is used as a measurement element to form a resistance strain gauge or is formed, as a coupling membrane element, together with the resistance strain gauge, or
- wherein the sensor is a hydraulic force sensor and is formed by a measurement piston which functions in a cylinder block chamber, and the pressure in the cylinder block chamber being output as a measured value of the support force, or
- wherein the sensor is used as a force measurement shaft to analyze the support force applied by a bracket of the movable machine and analyzes herein the bending of the shaft or an axial force at a support portion of the shaft.

27. The support force measurement apparatus according to claim 15, wherein the at least one measurement element is configured to counteract the effect of a transverse interferential force.

28. The support force measurement apparatus according to claim 15, wherein the sensor is redundantly arranged.

29. The support force measurement apparatus according to claim 15, wherein the signals from the sensor are analyzed and evaluated independently of each other.

* * * * *